United States Patent [19]

Schilling

[11] Patent Number: 5,205,513
[45] Date of Patent: Apr. 27, 1993

[54] METHOD AND SYSTEM FOR THE REMOVAL OF LARGE TURBINE ENGINES

[75] Inventor: Jan C. Schilling, Middletown, Ohio

[73] Assignee: General Electric Company, Cincinnati, Ohio

[21] Appl. No.: 765,797

[22] Filed: Sep. 26, 1991

[51] Int. Cl.$^5$ ............................................. B64D 27/00
[52] U.S. Cl. ..................................... 244/54; 248/554; 60/226.1
[58] Field of Search ................ 244/54, 53 R, 129.4; 248/554; 60/39.31, 226.1

[56] References Cited

U.S. PATENT DOCUMENTS

| | | | |
|---|---|---|---|
| 2,944,766 | 7/1960 | Freeding et al. | 60/39.31 |
| 3,347,578 | 10/1967 | Sheehan et al. | 292/113 |
| 3,720,060 | 3/1973 | Davies et al. | 60/39.31 |
| 3,823,553 | 7/1974 | Smith | 60/39.31 |
| 4,044,973 | 8/1977 | Moorehead | 244/54 |
| 4,132,069 | 1/1979 | Adamson et al. | 60/226 R |
| 4,150,802 | 4/1979 | Evelyn et al. | 244/54 |
| 4,283,028 | 8/1981 | Wilke | 244/54 |
| 4,585,189 | 4/1986 | Buxton | 244/54 |
| 4,683,717 | 8/1987 | Naud | 60/226.1 |
| 4,825,648 | 5/1989 | Adamson | 60/39.31 |
| 4,934,140 | 6/1990 | Dennison | 60/226.1 |

Primary Examiner—Joseph F. Peters, Jr.
Assistant Examiner—Christopher P. Ellis
Attorney, Agent, or Firm—Jerome C. Squillaro

[57] ABSTRACT

A detachable support structure for a large turbine aircraft engine having a nacelle which is attached to an auxiliary support frame. The auxiliary support frame has an upper portion which is attached to an upper portion of the nacelle. The auxiliary support frame has a lower portion which is detachable from the upper portion of the auxiliary frame. The lower portion of the auxiliary frame is connected to a lower portion of the nacelle, the lower portion of the nacelle being detachable from the upper portion of the nacelle. By removing the lower portion of the nacelle and the lower portion of the auxiliary support frame, the thrust producing section of the turbine engine can be removed intact.

10 Claims, 3 Drawing Sheets

— 5,205,513 —

METHOD AND SYSTEM FOR THE REMOVAL OF LARGE TURBINE ENGINES

CROSS-REFERENCE

Reference is made to a related copending application, herein incorporated by reference, entitled "Structure for Eliminating Lift Load Bending in Engine Core of Turbofan", filed Sep. 26, 1991, having U.S. patent application Ser. No. 765,804, (13DV-10150).

BACKGROUND OF THE INVENTION

The present invention relates to gas turbine engines for aircraft and, more particularly, to the engine housing of a gas turbine engine in which the fan outer nacelle and auxiliary support frame are each segmented into two 180 degree segments to allow for easy removal and installation of the thrust producing section of a large turbine engine.

Gas turbine engines for commercial aircraft generally have become increasingly larger with each generation of new aircraft. Some of the size increase is attributable to the need for increased power output of a turbofan engine in order to power larger aircraft. Some size increase is also attributable to the desire for more fuel-efficient engines achievable by increasing the engine bypass ratio. A higher bypass ratio requires a larger fan and a correspondingly larger diameter nacelle structure. Present generation aircraft gas turbine engines with high bypass ratios may have nacelle diameters in the range of twelve feet. Not only does this large engine create a clearance concern for under-wing mounting, but it also presents a concern for installation and removal on a timely basis for service.

U.S. patent application Ser. No. 765,804 entitled "Structure for Eliminating Lift Load Bending in Engine Core of Turbofan" filed Sep. 26, 1991, discloses a novel nacelle and frame mounting structure which is designed to prevent the engine core in a turbofan engine from experiencing large bending loads generated by inlet lift loads. This novel nacelle structure comprises a load carrying nacelle for efficient load transfer. The nacelle structure is capable of transferring loads directly from the inlet to the attaching pylon and isolating the engine gas generator from the load path. For such a nacelle structure, engine service requires detachment of the nacelle from the engine frame mount and removal of the fan blades. The outlet guide vane (OGV) assembly must also be removed after which the gas generator can be floated away to the aft of the nacelle structure.

Since time is of the essence when engine replacement is necessitated (usually overnight placement being desired), it is important that measures be taken to insure that quick engine replacement and maintenance are realized. Therefore, a need exists for a nacelle structure which would make the easy maintenance and replacement of large turbofan engines possible, including those engines which have a nacelle structure designed to prevent core bending of the engine.

SUMMARY OF THE INVENTION

Accordingly, one object of the present invention is to provide a structural support configuration for an aircraft turbine engine which minimizes installation and removal time.

Another object of the present invention is to provide a structural support configuration which allows the major thrust producing portion of the engine to remain intact when the removal of the turbine engine is desired.

These and other objects and advantages of the present invention are provided by a detachable support structure for a gas turbine aircraft engine having a fan casing which encloses a plurality of fan blades. A fan OGV assembly is connected to the aft end portion of the fan casing. A nacelle is connected to the aircraft pylon and auxiliary frame while surrounding the fan casing and fan OGV assembly. The nacelle has an upper portion and a lower portion. The lower portion of the nacelle is detachable from the upper portion of the nacelle. The forward region of the nacelle, which includes both lower and upper portions, is circumferentially connected to an air inlet.

An auxiliary support frame is connected to the nacelle at a location to the aft of the fan OGV assembly. The auxiliary support frame has an upper portion and a lower portion. The lower portion of the auxiliary support frame is detachable from the upper portion of the auxiliary support frame. The upper portion of the nacelle is connected to the aircraft pylon and the upper portion of the auxiliary support frame and the lower portion of the nacelle is connected to the lower portion of the auxiliary support frame. When connected, the upper and lower portions of the nacelle form a circle. Likewise, when connected, the upper and lower portions of the auxiliary frame form a second circle which is located radially inward from the circle formed by the connection of the upper and lower portions of the nacelle.

By detaching the lower portion of the nacelle from the upper portion of the nacelle, and by detaching the lower portion of the auxiliary support frame from the upper portion of the auxiliary support frame, the fan casing, the plurality of fan blades enclosed by the fan casing, the fan OGV assembly, and remainder of turbomachinery can be removed intact. This removal procedure includes an initial step of insuring that the air inlet is removed or connected to the nacelle in such a manner that the removal or attachment of the thrust producing section of the turbine engine is not prevented.

In short, the present invention allows for the easy and intact removal of the entire thrust producing section of the turbine engine.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings in which.

When referring to the drawings, it should be understood that like reference numerals designate identical or corresponding parts throughout the several views.

DETAILED DESCRIPTION OF THE INVENTION

Figure 1:
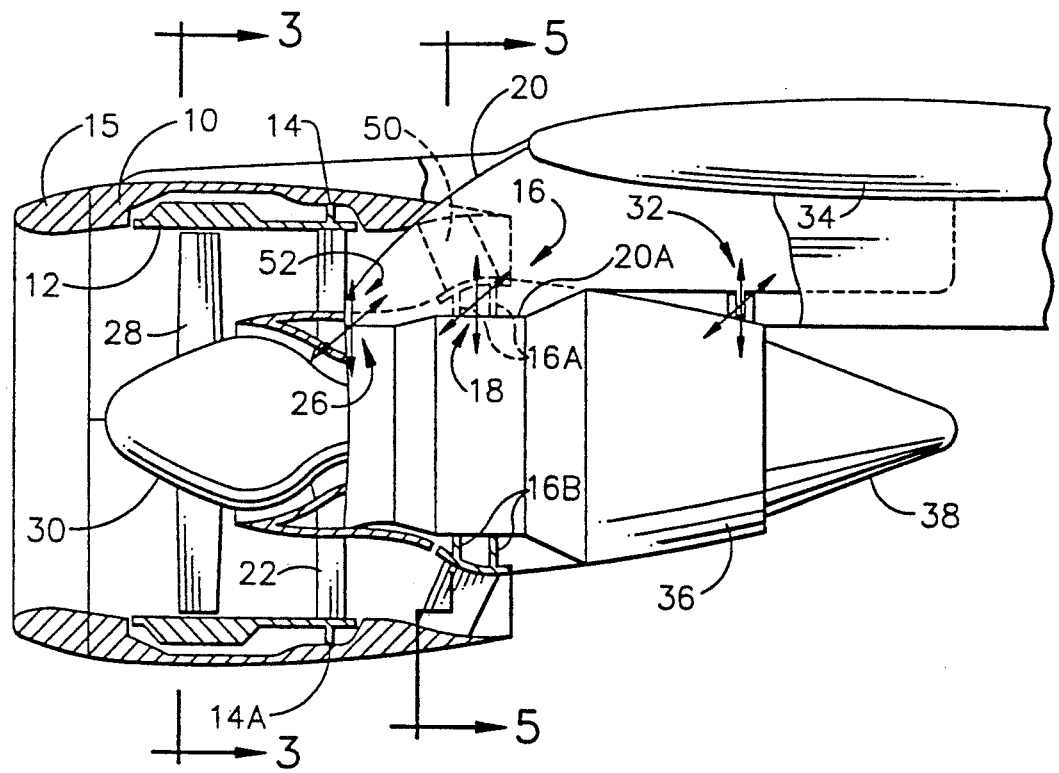
FIG. 1 is a schematic axial cross-sectional side-view of the engine and support structure of the present invention.

With reference to FIG. 1, fan outer nacelle 10 is located radially outward from fan casing 12 and connected thereto by slip joint 14 (slip joint 14 being designed to form a radial load path 14A). The forward section of fan outer nacelle 10 is comprised of inlet 15 which provides for air direction inward to the engine and outward to the nacelle. The rear of fan outer nacelle 10 connects to an auxiliary support frame 16 which connects to the floor 20A of pylon 20 by means of an auxiliary frame mount (to be discussed later). The location where the pylon floor 20A attaches to the auxiliary frame mount is indicated by auxiliary frame mount location 18. Pylon 20 extends from aircraft wing 34 and provides a means by which the turbine engine assembly can be attached to the aircraft. Pylon 20 extends from forward mount location 26 to rear mount location 32. The top of the pylon extends forward along the upper nacelle section.

Continuing in FIG. fan OGV's (outlet guide vanes), which comprise a fan OGV assembly 22, are located directly forward of forward mount location 26 and connect to fan casing 12 at a location proximate to slip joint 14. Located radially inward from fan casing 12 are fan blades 28 which are connected to fan disk 30. The engine core area 36 is located between forward mount location 26 and rear mount location 32, the rear portion 38 of the engine being located to the aft of rear mount location 32.

Figure 2:
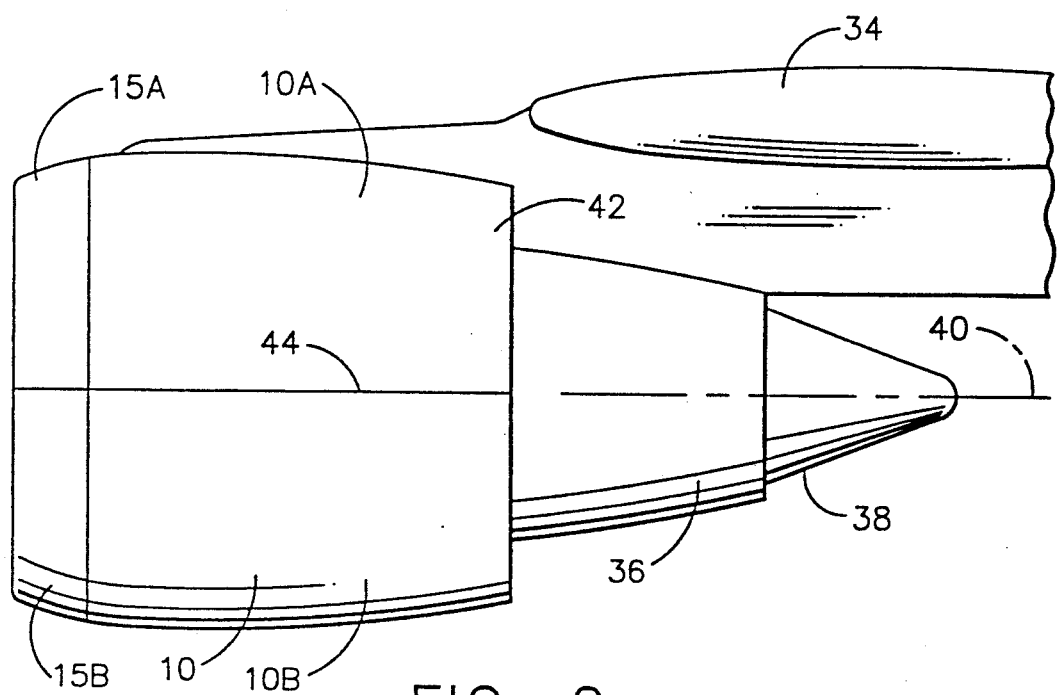
FIG. 2 is a schematic side-view of the dual 180 degree nacelle structure of the present invention.

With reference to FIG. 2, line 40 is an axial reference which extends horizontally through the center of the engine. Nacelle 10 is divided into an upper nacelle 10A and a lower nacelle 10B. In a like manner, inlet 15 is divided into an upper inlet 15A and a lower inlet 15B. Section 42 indicates the area where auxiliary support frame 16 is located, and line 44 indicates a line of demarcation by which the upper and lower halves of nacelle 10 and inlet 15 are divided.

Figure 3:
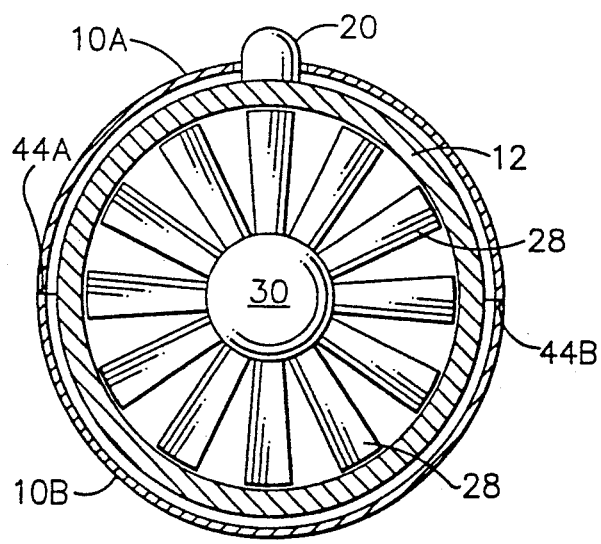
FIG. 3 is a cross-sectional frontal view taken along line A—A of FIG. 2.

In FIG. 3, fan blades 28 are surrounded by fan casing 12 which is located radially inward of the circle formed by upper half nacelle 10A and lower half nacelle 10B. Split locations 44A and 44B separate upper half nacelle 10A and lower half nacelle 10B into two 180 degree segments.

Figure 4A:
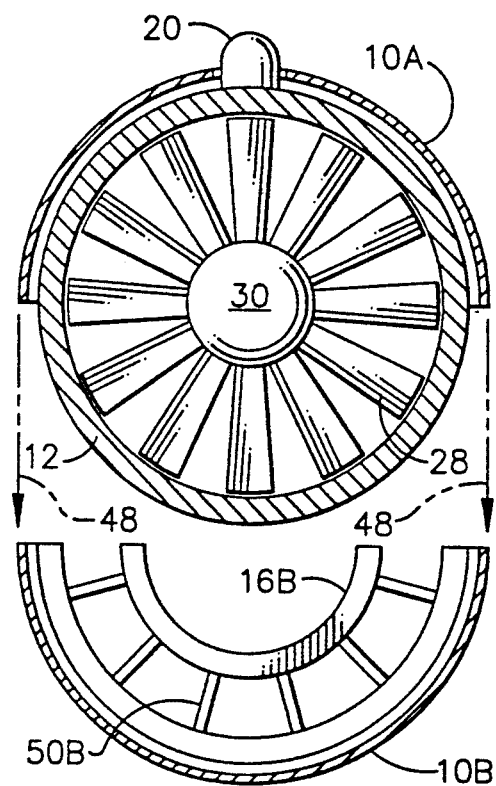
FIGS. 4A and 4B are exploded cross-sectional frontal views taken along line A—A of FIG. 2 and illustrate the lower nacelle and lower auxiliary frame being removed (FIG. 4A) and the engine being removed from the upper nacelle and upper auxiliary frame (FIG. 4B)
Figure 4B:
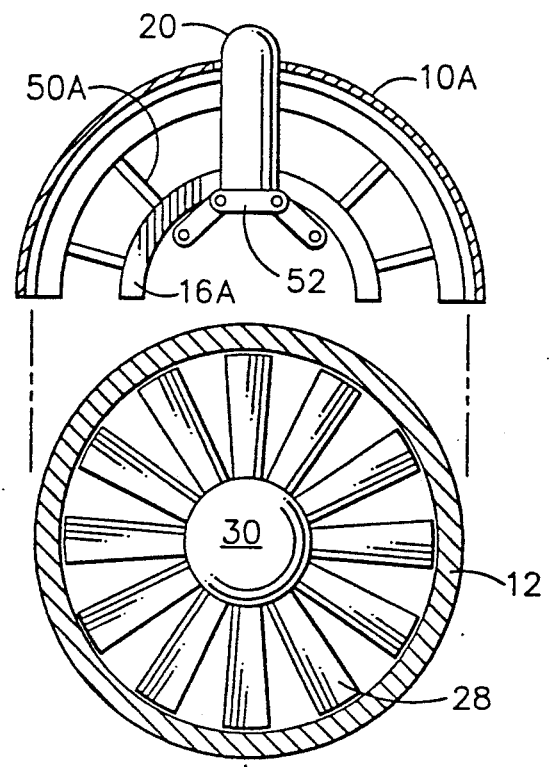

With reference to FIGS. 4A and 4B, fan casing 12 (FIG. 4A) lies in the vertical plane indicated by line A—A of FIG. 2 and surrounds fan blades 28. Located behind fan casing 12 is engine forward mount 52 (FIG. 4B) which attaches to pylon 20 at forward mount location 26 of FIG. 1. (A rear mount, not shown, similar to forward mount 52 connects to pylon 20 at rear mount location 32 of FIG. 1). Upper half auxiliary support frame 16A (FIG. 4B) and lower half auxiliary support frame 16B (FIG. 4A) are located behind engine forward mount 52 and are at the auxiliary mount location 18 of FIG. 1. Upper half auxiliary support frame 16A connects to upper nacelle 10A by means of struts 50A (FIGS. 4B and 5) and lower half auxiliary support frame 16B (FIGS. 4A and 5) connected to lower nacelle 10B by means of struts 50B.

The upper half auxiliary support frame 16A is attached to an auxiliary mount (not shown) similar to engine forward mount 52. The auxiliary mount attaches to pylon 20. In such a manner, upper half auxiliary support frame 16A and upper half nacelle 10A are firmly secured to the pylon 20.

Figure 5:
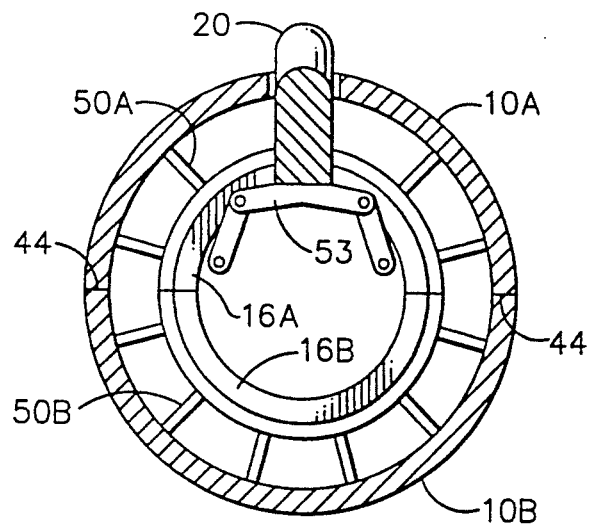
FIG. 5 is a front cross-sectional schematic illustration taken along line B—B of FIG. 2.

With reference to FIG. 5, upper half auxiliary support frame 16A is connected to detachable lower half auxiliary support frame 16B. Upper half auxiliary support frame 16A is attached to auxiliary frame mount 53 which is secured to pylon 20. Upper half auxiliary support frame 16A is connected to upper nacelle 10A by means of struts 50A, and lower half auxiliary support frame 16B is connected to lower nacelle 10B by means of struts 50B.

Since the easy removal of turbine engine components is desired, fan inlet 15, nacelle 10, and auxiliary support frame 16 are formed by two 180 degree sections about the 3 and 9 o'clock positions. The respective upper and lower sections are connected by securing means (not shown) which comprise clamped connections. By disconnecting lower inlet 15B from upper inlet 15A, by disconnecting lower nacelle 10B from upper nacelle 10A, and by disconnecting lower auxiliary support frame 16B from upper support frame 16A, the engine can be removed. Thus, the entire thrust producing fan section (blades, casing, and OGV's) of the engine can be removed with the remainder of the engine intact without the need for a laborious piece-by-piece disassembly.

Further, the removed parts (blades, casing, and OGV's) could be replaced by an intact thrust producing section, i.e., blades 28, fan casing 12, and fan OGV's 22, Which is tested and ready for service.

When it is desired to remove the thrust producing section of the engine, the upper nacelle 10A and lower nacelle 10B must be unbolted. However, since the upper nacelle 10A is connected to upper half auxiliary support frame 16A which is connected to lower half auxiliary support frame 16B (FIG. 5), it is also necessary to disconnect the lower half auxiliary support frame 16B from the upper half auxiliary support frame 16A. The lower half support frame 16B and lower half nacelle 10B can then be removed in the direction indicated by arrow 48 (FIG. 4A). Once the lower half nacelle 10B and lower half auxiliary support frame 16B are removed, the fan casing 12 and fan blades 28 may be removed as well (FIG. 4B). Since fan OGV's 22 are connected to the nacelle 10 by means of slip joints 14 (FIG. 1) which connect to the end portion of fan casing 12, the fan OGV's are simply removed with the engine structure.

Figure 6:
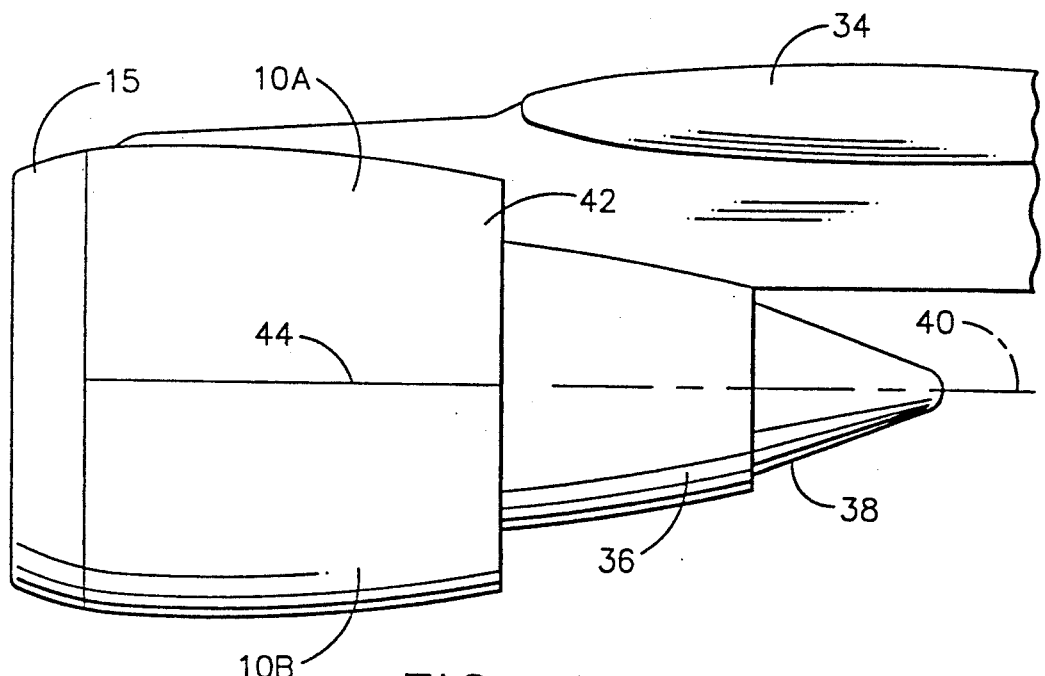
FIG. 6 is similar to FIG. 2 except that FIG. 6 illustrates a 360 degree air inlet.

It may be desired for structural and flowpath reasons to have a 360 degree inlet 15 such as that of the alternative embodiment of the invention depicted in FIG. 6 in which inlet 15 is detachably connected to nacelle 15. If such is the case, the removal of the engine thrust producing section, i.e., blades, fan casing, and OGV's, would proceed as previously described except that the 360 degree inlet could remain supported via nacelle 10A or could be removed first.

The present invention provides a configuration which minimizes engine installation and removal time while maintaining intact the major thrust producing section of the engine.

The foregoing detailed description of the preferred embodiments of the invention is intended to be illustrative and non-limiting. Many changes and modifications are possible in light of the above teachings. Thus, it is understood that the invention may be practiced otherwise than as specifically described herein and still be within the scope of the appended claims.

What is claimed is:

1. A detachable support structure for a turbofan engine comprising:
    a fan casing having a distal portion and enclosing a plurality of fan blades;
    a fan outlet guide van assembly connecting the distal end portion of said fan casing to the turbofan;
    a nacelle connected to said fan casing, said nacelle having an upper portion;
    first means for permitting the intact removal of said fan casing, said plurality of fan blades, and said fan outlet guide vane assembly from nacelle;
    an auxiliary support frame having an upper portion connected to said upper portion of said nacelle; and
    second means for permitting the intact removal of said fan casing, said plurality of fan blades, and said fan outlet guide van assembly from the auxiliary support frame.

2. The structure according to claim 1 wherein:
    said nacelle has a lower portion and wherein said nacelle includes means for releasably detaching the lower portion of said nacelle from said upper portion of said nacelle.

3. The structure according to claim 2 wherein said second means for removing comprises a detachable lower portion of said auxiliary support frame, and wherein aid second means includes means for releasably connecting said upper portion of said auxiliary support frame to said lower portion of said auxiliary support frame.

4. The structure according to claim 3 further comprising means for connecting said detachable lower portion of said auxiliary frame support to said detachable lower portion of said nacelle.

5. The structure according to claim 4 wherein said auxiliary support frame is located radially inward from said nacelle.

6. The structure according to claim 5 wherein when connected, said upper portion and said detachable lower portion of said nacelle form a circle.

7. A method for removing intact a thrust section of a turbine aircraft engine assembly from a nacelle, the engine assembly including an engine, a fan casing enclosing a plurality of fan blades and being driven by the engine an outlet guide vane assembly connected to the fan casing and supporting the engine, said nacelle being connected to an upper and lower auxiliary support frame to support the engine assembly, the method comprising the steps of:
    removing a lower half portion of the nacelle from an upper half portion of the nacelle;
    removing the lower half portion of the auxiliary support frame from the upper half portion of the auxiliary support frame after the lower half portion of the nacelle is removed; and
    removing intact the engine assembly including the fan casing the plurality of fan blades which are enclosed by the fan casing, the engine and the fan outlet guide van assembly from the nacelle and auxiliary support frame after the lower half portion of the auxiliary support frame is removed.

8. The structure according to claim 7 further comprising the step of connecting an inlet member to a forwardmost portion of said lower and upper halves of said nacelle.

9. A gas turbofan engine assembly and support structure comprising:
    a pylon attached to an aircraft;
    a nacelle having an upper half portion detachably connected to a lower half portion;
    means for attaching the upper half portion of the nacelle to the aircraft;
    an engine assembly comprising:
        (a) an engine means having an axial line extending horizontally therethrough;
        (b) a fan disk rotatably connected to the engine and operable to rotate about the axial line;
        (c) a plurality of fan blades attached to the fan disk;
        (d) a fan casing encircling said plurality of fan blades; and
        (e) an outlet guide vane assembly connecting said engine to said fan casing;
    an auxiliary support frame encircling said engine means said support frame having an upper support frame portion detachably connected to a lower support frame portion;
    means for attaching said support frame to said nacelle;
    means for removably attaching said engine means to said pylon;
    means for removably attaching said casing to said nacelle; and
    said auxiliary support frame including means for removably supporting said engine assembly such that when said lower half of said nacelle is detached from the upper half of said nacelle, when said engine means is detached from said pylon, and when said lower support frame portion is detached from said upper support frame portion, said engine assembly is removable intact from said pylon, said nacelle and said aircraft.

10. The assembly and structure as recited in claim 9 further comprising a 360° inlet detachably connected to a face of the nacelle when said upper nacelle is connected to the lower nacelle.

* * * * *